(12) United States Patent
Klaus-Manfred

(10) Patent No.: US 6,680,603 B1
(45) Date of Patent: Jan. 20, 2004

(54) HIGH-EFFICIENCY METHOD AND PULSE GENERATOR FOR GENERATING SHORT VOLTAGE PULSES

(75) Inventor: Steinich Klaus-Manfred, Poering (DE)

(73) Assignee: ASM Automation Sensorik Messtechnik GmbH, Unterhaching (DE)

( * ) Notice: Subject to any disclaimer, the term of this patent is extended or adjusted under 35 U.S.C. 154(b) by 0 days.

(21) Appl. No.: 09/416,538

(22) Filed: Oct. 12, 1999

Related U.S. Application Data

(63) Continuation of application No. PCT/EP98/02108, filed on Apr. 9, 1998.

(30) Foreign Application Priority Data

Apr. 10, 1997 (DE) .......................................... 198 14 980

(51) Int. Cl.⁷ .............................................. G05F 1/563
(52) U.S. Cl. ...................... 323/266; 323/222; 363/124
(58) Field of Search ................................ 323/222, 266, 323/282; 363/124

(56) References Cited

U.S. PATENT DOCUMENTS

| | | | | |
|---|---|---|---|---|
| 3,571,697 A | * | 3/1971 | Phillips | |
| 3,974,439 A | | 8/1976 | Holland | |
| 4,155,112 A | * | 5/1979 | Miller et al. | |
| 4,434,402 A | | 2/1984 | Lane | 324/393 |
| 4,473,875 A | * | 9/1984 | Parsons et al. | 363/124 |
| 4,549,254 A | * | 10/1985 | Kissel | 323/222 |
| 4,683,529 A | * | 7/1987 | Bucher | 323/222 |
| 4,792,887 A | * | 12/1988 | Bernitz et al. | 323/222 |
| 4,864,213 A | * | 9/1989 | Kido | 323/222 |
| 5,289,108 A | * | 2/1994 | Bourqui et al. | 323/222 |
| 5,406,471 A | * | 4/1995 | Yamanaka | 363/124 |
| 5,408,203 A | * | 4/1995 | Okano et al. | 323/222 |
| 5,587,680 A | | 12/1996 | Smith | 327/291 |
| 5,610,502 A | * | 3/1997 | Tallant | 323/222 |
| 5,757,166 A | * | 5/1998 | Sodhi | 363/124 |
| 6,232,752 B1 | * | 5/2001 | Bissell | 323/222 |

FOREIGN PATENT DOCUMENTS

| | | | | |
|---|---|---|---|---|
| DE | 31 31 455 A1 | 8/1981 | | G01B/17/00 |
| DE | 40 05 129 A1 | 2/1990 | | H05B/6/22 |
| DE | 295 446 | 10/1991 | | H03K/3/53 |
| DE | 195 48 629 | 7/1997 | | H03K/5/07 |
| EP | 0 153 437 A1 | 5/1984 | | G08C/15/00 |
| EP | 0 320 307 A2 | 12/1988 | | H02M/3/156 |
| EP | 0 478 436 A1 | 9/1991 | | F02D/41/20 |
| FR | 2 489 056 | 8/1981 | | H03K/3/57 |
| FR | 2 538 942 | 12/1982 | | H01F/7/18 |
| JP | 57-91023 | 7/1982 | | H03K/3/53 |
| JP | 60-5620 | 12/1985 | | H03K/3/53 |
| WO | WO 92/15844 | 9/1992 | | G01D/5/48 |
| WO | WO 97/23765 | 7/1997 | | G01D/3/02 |

OTHER PUBLICATIONS

Baranowski et al., "Transistorschaltungen in der Impulstechnik", VEB verlag Technik, Berlin, Dec. 1966.

* cited by examiner

*Primary Examiner*—Jeffrey Sterrett
(74) *Attorney, Agent, or Firm*—Crowell & Moring LLP

(57) ABSTRACT

In a high-efficiency method and pulse generator for generating short voltage pulses by means of a voltage booster having a first switch, an inductor and a storage capacitor, the first switch generates in the inductor current pulses which are fed to the storage capacitor when the output voltage falls below a predetermined limit value. The pulse generator thus generates a pulse output voltage which is greater than a fed input voltage and is in any desired relationship therewith. The pulse output voltage is fed to a load element by an output switch. The power losses remain low due to pulse-wise charging of a storage capacitor with current pulses.

27 Claims, 6 Drawing Sheets ing to the invention.

HIGH-EFFICIENCY METHOD AND PULSE GENERATOR FOR GENERATING SHORT VOLTAGE PULSES

This application is a continuation of International Application No. PCT/EP98/02108 filed Apr. 9, 1998.

FIELD OF THE INVENTION

The present invention concerns a high-efficiency method and a pulse generator for generating voltage pulses.

The pulse generator can be for example part of an ultrasonic position sensor.

BACKGROUND OF THE INVENTION

U.S. Pat. No. 5,587,680 describes a pulse generator having a charge pump which by voltage doubling with connected capacitors generates a pulse output voltage which is higher than the supplied input voltage. The capacitors are charged up in parallel from the regulated charging voltage of a dc voltage source and connected in series for pulse generation purposes. A disadvantage of the described doubler circuit is that, in order to achieve a constant output voltage which is independent of the fluctuations in the input voltage, the input voltage must firstly be regulated down to a defined voltage value. That is effected by linear regulation and gives rise to power losses in the dc voltage source. A further disadvantage is that the voltage can only be increased in integral multiples of the regulated dc voltage, in accordance with the number of cascade elements.

SUMMARY OF THE INVENTION

An object of the present invention is to provide a method of generating short voltage pulses, which can afford a high level of efficiency combined with a simple and thus reliable operating procedure.

Another object of the present invention is to describe a pulse generator whose output voltage can be established in any relationship to the input voltage and whose output voltage is regulated to a predefined value and power losses due to linear regulation are avoided.

In accordance with the principles of the present invention, in the method aspect, the foregoing and other objects are attained by a high-efficiency method of generating short voltage pulses comprising the generation by means of a first switch in an inductor of current pulses which are fed to a storage capacitor at which an output voltage occurs. The first switch is controlled by a pulse regulator until the output voltage reaches a predetermined limit value.

Further in accordance with the principles of the invention, in the apparatus aspect, the foregoing and other objects are attained by a high-efficiency pulse generator for generating short voltage pulses including a voltage booster having a first switch, an inductor and a storage capacitor. The first switch generates in the inductor current pulses which are fed to the storage capacitor when an output voltage falls below a predetermined limit value.

Further objects, features and advantages of the invention will be apparent from the description hereinafter of preferred embodiments of the method and apparatus according to the invention.

DESCRIPTION OF THE PREFERRED EMBODIMENTS

Figure 3:
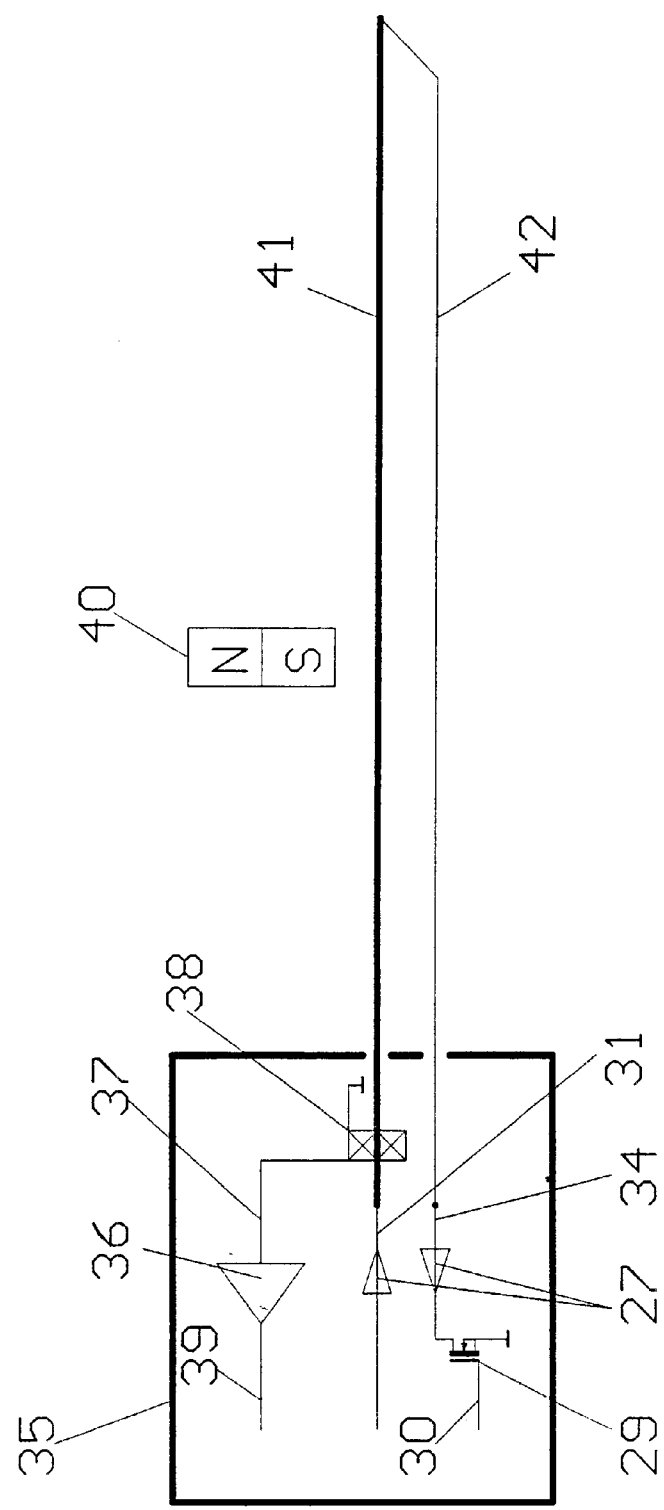
FIG. 3 shows part of an ultrasonic position sensor incorporating the apparatus according to the invention.

Referring firstly to FIG. 3 for illustrative purposes shown therein is a pulse generator for generating voltage pulses as part of an ultrasonic position sensor comprising a waveguide 41 in which an ultrasonic pulse is excited by a current pulse and transmitted, an ultrasonic exciter circuit indicated at 4 in FIG. 1 in which the current pulse 27 is excited by an electrical voltage pulse 30, a magnet 40 whose magnetic field in conjunction with the current pulse triggers the ultrasonic pulse, and a detector 36, 37, 38, 39 for receiving the ultrasonic pulse at one end of the waveguide. The transit time of the ultrasonic pulse through the waveguide 41 beginning with generation of the current pulse 27 up to reception by the detector is a measurement in respect of the magnet position to be measured. In addition the pulse generator can advantageously be used for the generation of voltage and current pulses at opto-electronic components or piezoelectric control members.

Figure 1A:
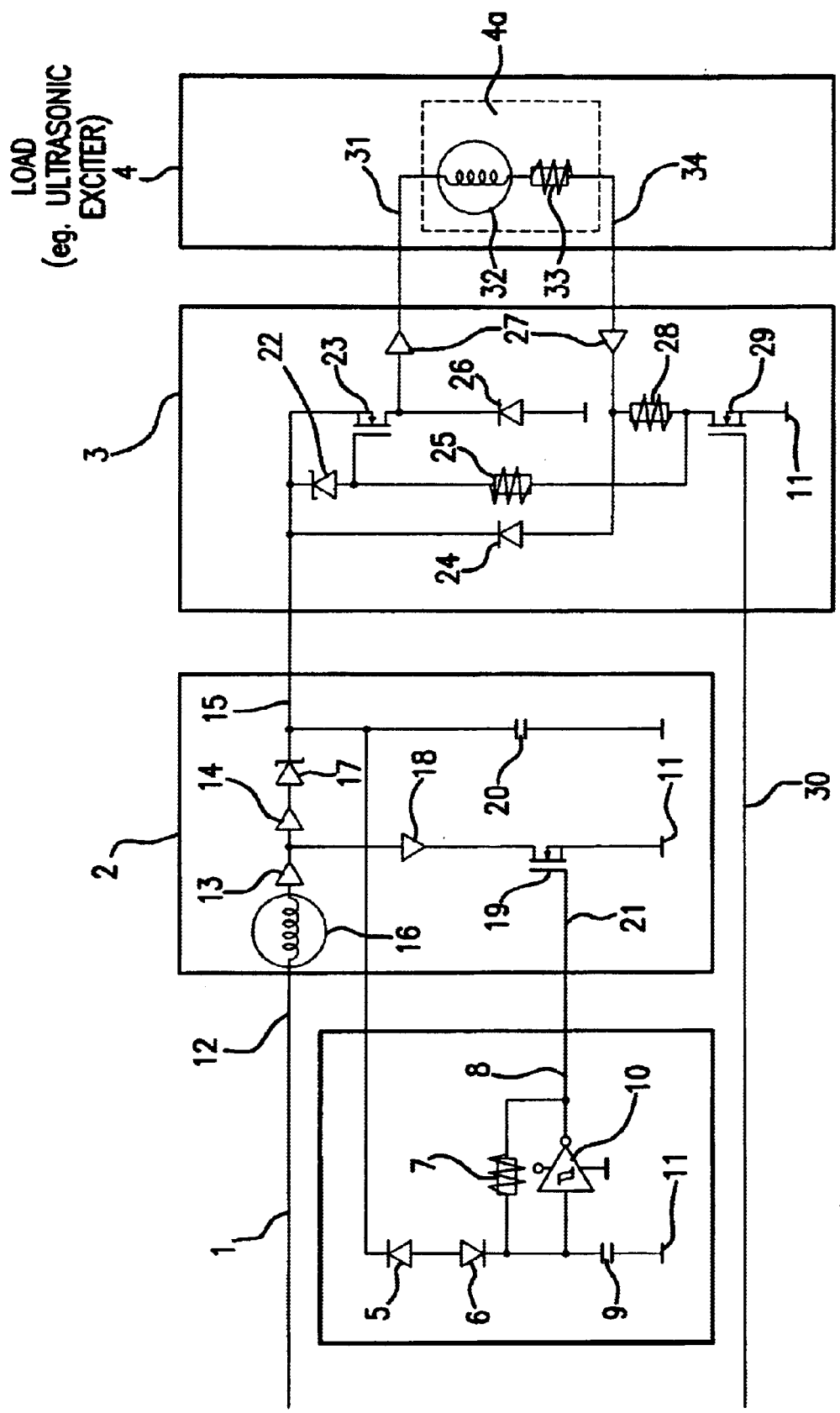
FIG. 1a is a diagrammatic view of an arrangement according to the invention.
Figure 1B:
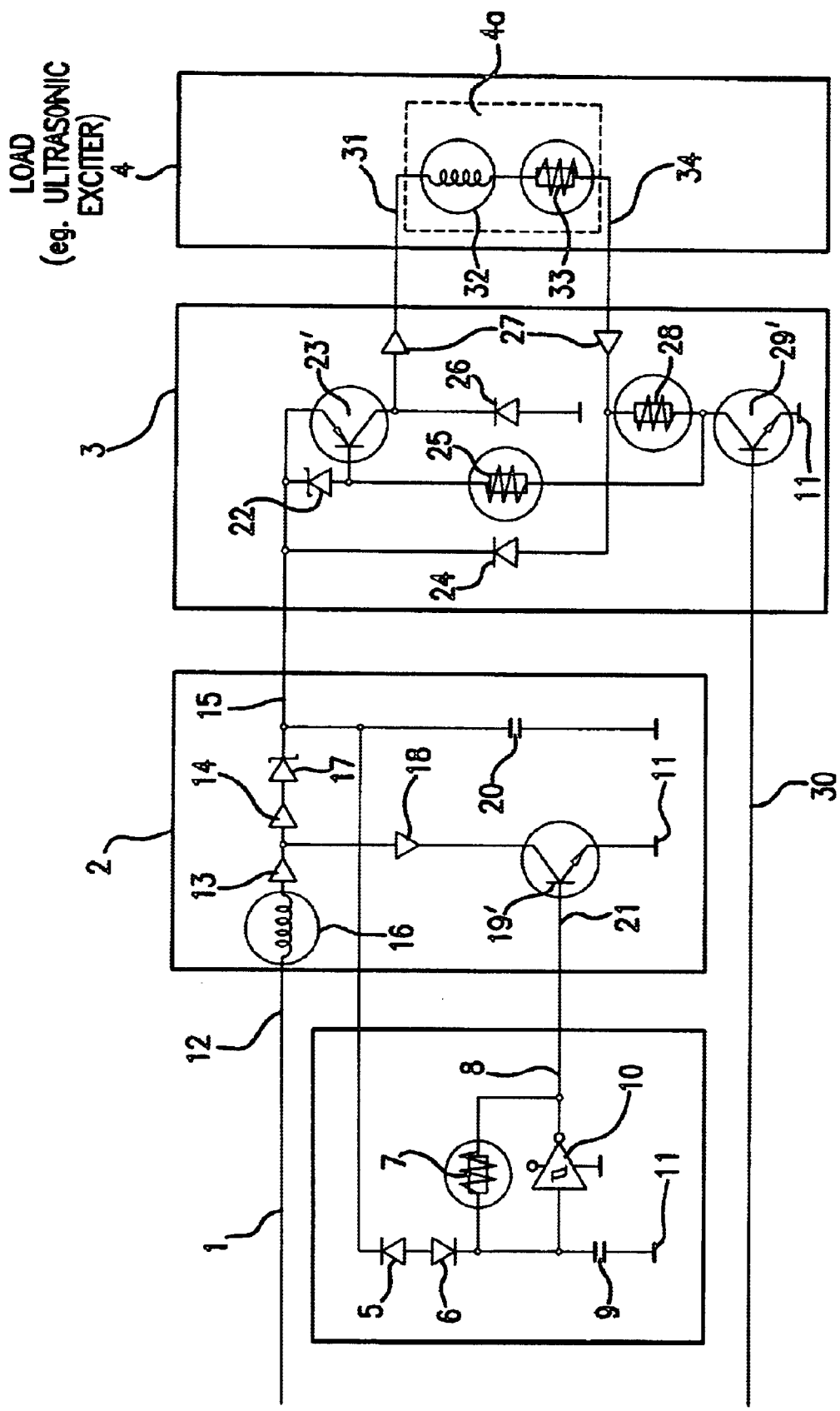
FIG. 1b is a diagrammatic view of an alternative embodiment of the invention.

Looking now also at FIGS. 1a and 1b, the pulse generator serves for the generation of electrical voltage pulses on a load element 4, as indicated above, preferably for the excitation of current pulses in the current pulse exciter circuit 4a of a known ultrasonic position sensor 35 which is shown in FIG. 3. The current pulse exciter circuit 4 with a first terminal 31 and a second terminal 34 comprises a current conductor 42 in FIG. 3 which passes current pulses 27 along the waveguide 41 and back. The waveguide 41 itself can be part of the current conductor 42. In co-operation with the magnet field of the magnet 40, ultrasonic pulses are generated by the current pulses, in the ultrasonic waveguide 41. The ultrasonic pulses are transmitted in the ultrasonic waveguide and evaluated at the end thereof by a detector, comprising a coil 38 and a signal-processing unit 36 as shown in FIG. 3. The signal-processing unit receives an electrical signal 37 received by the coil 38 and generates an electrical position signal 39 which is afforded in known manner by measurement of the transit time of the ultrasonic signal from the position of the magnet 40 guided along the waveguide 41, to the detector. Other uses of the pulse generator as well as other load elements such as for example load impedances, semiconductor devices, optical components or piezoelectric control members are possible.

Figure 2:
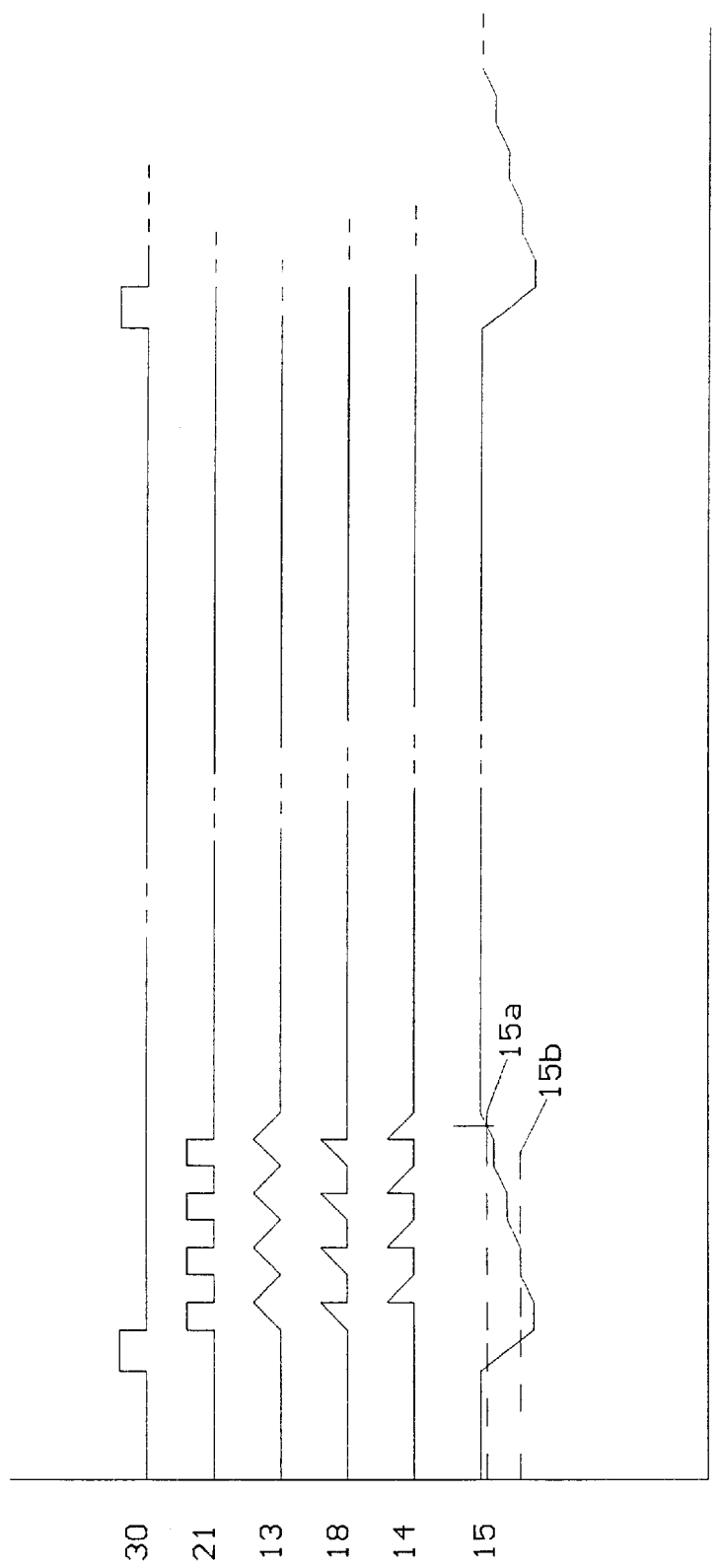
FIG. 2 shows pulse and voltage configurations.

A voltage booster or step-up device 2 in FIG. 1 comprises an inductor 16, a first switch 19, a second switch 17 and a storage capacitor 20. An input voltage 12 is fed to the first terminal of the inductor 16 and the second terminal of the inductor 16 is connected to the first switching terminal of the first switch 19 and to the first switching terminal of the second switch 17. The second switching terminal of the second switch 17 is connected to the first terminal of the storage capacitor 20 while the second terminal of the storage capacitor is connected to a reference potential 11. The second switching terminal of the first switch 19 is connected to the reference potential 11. As shown in the pulse diagram in FIG. 2 the first switch 19 such as an N-channel MOSFET or bipolar transistor generates substantially triangular current pulses 13 in the inductor 16. In that situation a part of the current pulses 18, which increases due to self-induction, flows through the first switch 19. The second switch 17 such as a diode feeds the current pulses generated in the inductor 16 to the storage capacitor 20. In that situation a part of the current pulses 14, which dies away due to self-induction, flows through the second switch 17. The current pulses generate an output voltage 15 which is applied to the storage capacitor 20 and which is greater than or equal to the supplied input voltage 12.

Figure 4:
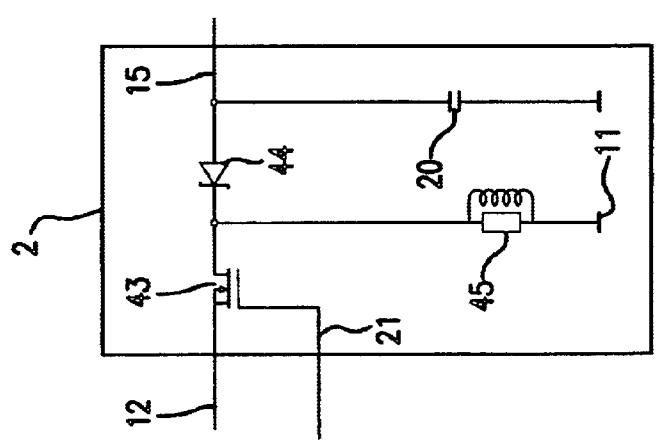
FIG. 4 shows a voltage booster as part of the apparatus according to the invention.

An alternative embodiment of a voltage booster or step-up device 2 in FIG. 4 comprises an inductor 45, a first switch 43, a second switch 44 and the storage capacitor 20. The circuitry of the components involved corresponds to the above-indicated embodiment but the positions of the inductor and the first switch have been interchanged, in relation to the above-discussed embodiment. The first switch 43 is preferably a P-channel MOSFET or a PNP-bipolar transistor while the second switch 44 is preferably a diode and is of such polarity, in comparison with the above-discussed embodiment, that negative current pulses are passed to the storage capacitor 30. The output voltage 15 of this embodiment is negative and of the same or larger magnitude than the supplied input voltage 12.

Figure 7:
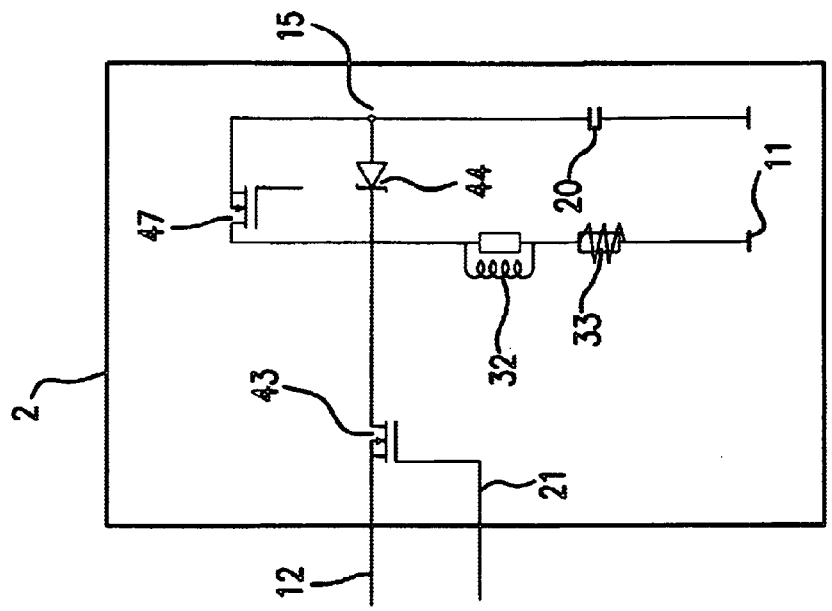
FIGS. 6 and 7 show alternative embodiments of the voltage booster as part of the arrangement according to the invention.
Figure 6:
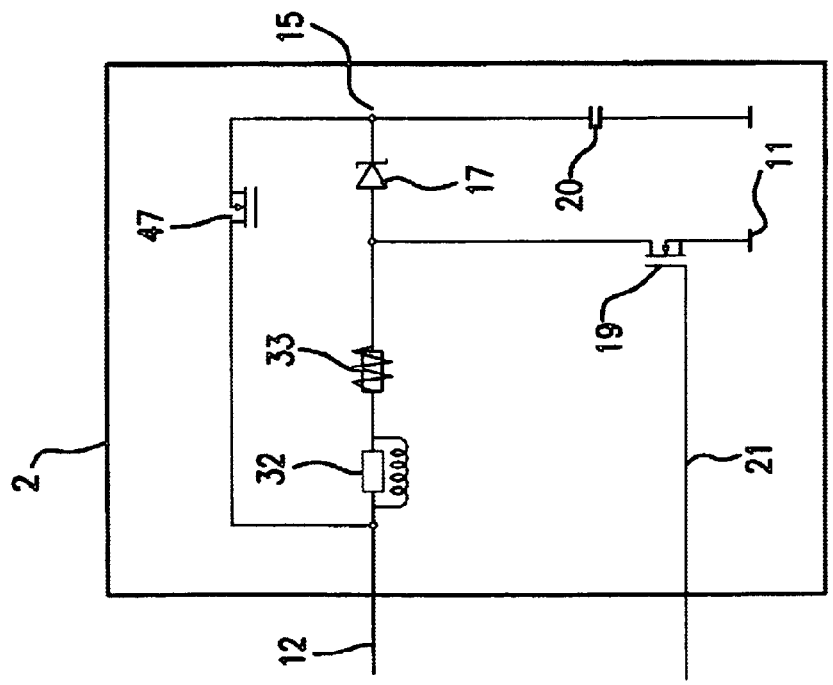

Two further alternative embodiments of a voltage booster or step-up device 2 in FIGS. 6 and 7 provide that an inductor 32 of the current pulse exciter circuit of a ultrasonic position sensor is used at the same time as the inductor 16 of the voltage booster. The embodiment shown in FIG. 6 of such a voltage booster comprises a current pulse exciter circuit 32, 33, a first switch 19, a second switch 17, a storage capacitor 20 and a switch 47 at the output side. An input voltage 12 is fed to the first terminal of the current pulse exciter circuit. The second terminal of the current pulse exciter circuit is connected to the first switching terminal of the first switch 19, preferably an N-channel MOSFET or an NPN-bipolar transistor and to the first switching terminal of the second switch 17, preferably a Schottky diode. The second switching terminal of the second switch 17 is connected to the first terminal of the storage capacitor 20 and the second terminal of the storage capacitor is connected to the reference potential 11. The second switching terminal of the first switch 19 is connected to the reference potential. The switch 47 at the output side is connected between the input-side first terminal of the current pulse exciter circuit and the first terminal of the storage capacitor 20. Current pulses are excited in the current pulse exciter circuit 32, 33 by the first switch 19 of the voltage booster 2 and fed by way of the second switch 17 which is preferably in the form of a diode to the storage capacitor 20.

In an embodiment as shown in FIG. 6, after charging of the storage capacitor to a predefined voltage value, the first switch 19 is closed and the output voltage, applied to the storage capacitor, of the voltage booster is fed to the current pulse exciter circuit by means of the switch 47 at the output side.

In the embodiment as shown in FIG. 7 after charging of the storage capacitor 20 to a predefined voltage value, the first switch 19 is opened and the output voltage, applied to the storage capacitor of the voltage booster is fed to the current pulse exciter circuit by means of the further switch 47. In this case the diode 17 serves at the same time as a free-running diode for the induction energy stored in the current pulse exciter circuit.

The embodiments of FIGS. 6 and 7 can be used when the load element 4 is an inductor. If the embodiment of a voltage booster as shown in FIG. 7 is used to generate current pulses in the current pulse exciter circuit of an ultrasonic position sensor for example as in FIG. 3, it is particularly advantageous that a reversal in the direction of the current pulses in the waveguide at 41 in FIG. 3 gives rise to total magnetization reversal of the waveguide material and hysteresis effects in terms of positional determination are compensated. Further alternative embodiments of a voltage booster are possible.

The output voltage of the voltage booster is passed to a pulse regulator 1 shown in FIG. 1 for regulating the output voltage and a control signal 21 is fed by the pulse regulator 1 to the control input of the first switch 19 of the voltage booster 2. An embodiment of the pulse regulator as shown comprises a Zener diode 5, a diode 6, a Schmitt trigger inverter 10 in the form of a logic gate 74HC14 in a single logic gate configuration, a resonant circuit capacitor 9 and a resistor 7. The cathode of the Zener diode 5 is connected to the output voltage 15 of the voltage booster 2 at the first terminal of the storage capacitor 20, the anode of the Zener diode is connected to the anode of the diode 6, the cathode of the diode 6 is connected to the input of the Schmitt trigger inverter 10, the first terminal of the resonant circuit capacitor 9 is connected to the input of the Schmitt trigger inverter 10, the second terminal of the resonant circuit capacitor 9 is connected to the reference potential 11. The first terminal of the resistor 7 is connected to the input of the Schmitt trigger inverter 10, the second terminal of the resistor 7 is connected to the output of the Schmitt trigger inverter 10, and the output of the Schmitt trigger inverter 10 is connected to the control input of the first switch 19 of the voltage booster 2. The Schmitt trigger inverter 10 is supplied with a regulated supply voltage of between 1V and 15V. The pulse regulator feeds a control signal 21 to the first switch 19 of the voltage booster. The resistor 7, the resonant circuit capacitor 9 and the Schmitt trigger inverter 10 form a controllable oscillator whose oscillation is influenced by the partial voltage which is supplied by way of Zener diode 5 and the diode 6 and which is derived from the output voltage. If the output voltage 15 to be regulated falls below a predefined lower value indicated at 15b in FIG. 2, oscillation occurs, and the output 8 of the Schmitt trigger inverter 10 generates voltage pulses with which the first switch 19 of the voltage booster is switched on and off and current pulse are generated. If the output voltage exceeds a predefined upper value at 15a, in FIG. 2, the oscillation ceases, the output 8 of the Schmitt trigger inverter 10 and therewith the control signal 21 for the first switch 19 of the voltage booster assumes the state of logic zero, it remains switched off and no current pulses are generated. The charging procedure for the storage capacitor 20 can also be controlled in relation to a single threshold value. For the above-described situation, the upper value 15a would then be equal to the lower value 15b. The voltage pulses generated by the pulse regulator 1 switch the first switch 19 of the voltage booster on for a first predefined period of time and off for a second predefined period of time. The first predefined period of time determines the current strength of the current pulses 13 through the inductor 16. The first predefined period of time of voltage pulses generated by the pulse regulator is influenced by the level of the supplied output voltage of the voltage booster as the switching point of the Schmitt trigger inverter 10 is shifted by the supplied voltage. This advantageously provides for additional regulation by pulse width modulation in the region of small deviations from the predefined reference value 15a of the output voltage. The reference value in respect of the output voltage of the voltage booster, which is to be regulated, is predetermined by the choice of the Zener voltage of the Zener diode 5. A combination by the series connection of a plurality of Zener diodes makes it possible to predetermine voltage reference values which are not covered by individual Zener diodes. The diode 6 prevents the Zener diode from becoming forwardly conducting when the operating voltage of the voltage booster 2 and pulse regulator 1 is switched on and the Schmitt trigger inverter 10 keeps the first switch 19 of the voltage booster 2 switched on.

It will be appreciated that other embodiments of a pulse regulator, which convert the output voltage to be regulated of the voltage booster into control voltage pulses for the actuation of the first switch 19, are possible.

An embodiment in FIG. 1 of a switch 3 on the output side comprises a first load switch 23 in the form of a P-channel MOSFET-transistor or a PNP-bipolar transistor, a second load switch 29 in the form of an N-channel MOSFET-transistor or an NPN-bipolar transistor, a first diode 24 for energy return or recovery, a second diode 26 for energy return or recovery, a Zener diode 22 and a resistor 25. The first switching terminal of the first load switch 23 is connected to the output voltage 15 of the voltage booster 2, the second switching terminal of the first load switch 23 is connected to the first terminal 31 of the ultrasonic exciter circuit 4 which is shown in equivalent fashion as an inductor 32 and a resistor 33. The first switching terminal of the second load switch 29 is connected to the first terminal 34 of the ultrasonic exciter circuit and the second switching terminal of the second load switch 29 is connected to the reference potential 11. The cathode of the first diode 24 is connected to the output voltage of the voltage booster 2 and the anode of the first diode 24 is connected to the second terminal of the ultrasonic exciter circuit. The cathode of the second diode 26 is connected to the first terminal 31 of the ultrasonic exciter circuit while the anode of the second diode 26 is connected to the common reference potential 11. The cathode of the Zener diode 22 is connected to the output voltage of the voltage booster 2 and its anode is connected to the gate terminal of the P-channel MOSFET-transistor as switch 23 and by way of the resistor 25 to the drain terminal of the N-channel MOSFET-transistor as switch 29. By way of the Zener diode 22 and the resistor 25 the P-channel MOSFET-transistor is also switched on by virtue of the N-channel MOSFET-transistor being switched on so that to generate a current pulse in the ultrasonic exciter circuit, both load switches 23, 29 are switched on at the same time and the voltage at the storage capacitor 20 of the voltage booster is fed to the ultrasonic exciter circuit. A signal for generating current pulses indicated at 30 in FIG. 2 in the ultrasonic exciter circuit, which is generated by a control unit that is not described herein, is fed to the gate terminal of the N-channel MOSFET-transistor 29. After the switches 23, 29 are switched off the diodes 24, 26 pass the self-induction energy from the ultrasonic exciter current back into the storage capacitor 20 in the form of a current pulse.

Figure 5:
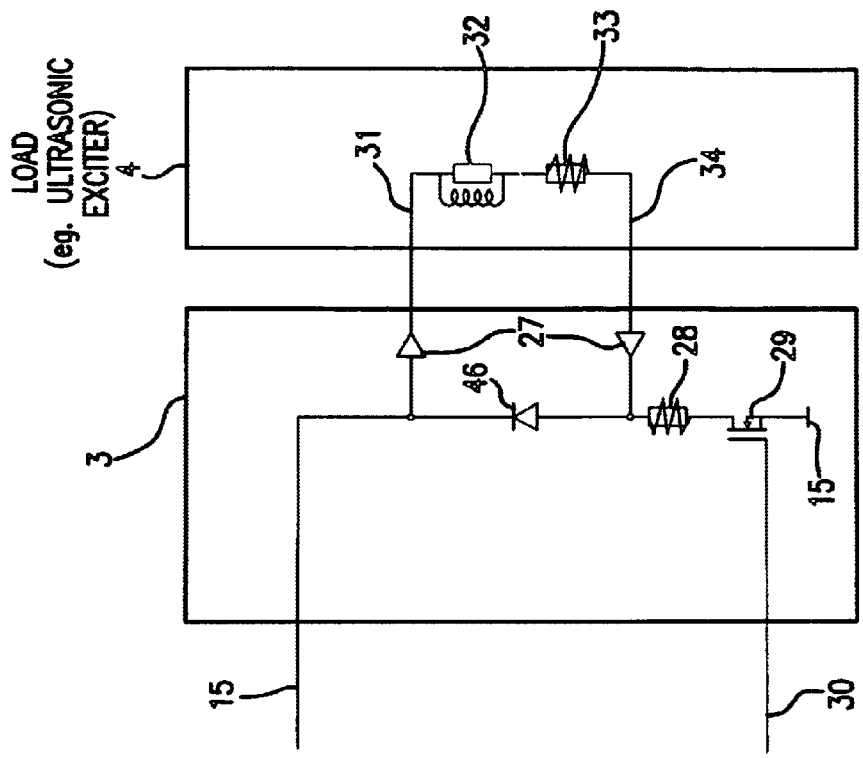
FIG. 5 shows a further part of the apparatus.

An embodiment shown in FIG. 5 of a switch 4 at the output side without energy return or recovery comprises a load switch 29 and a diode 46. A first terminal 31 of the ultrasonic exciter circuit 4 is connected to the output voltage 15 of the voltage booster 2. The first switching terminal of the load switch 29 is connected to the second terminal 34 of the ultrasonic exciter circuit and a second switching terminal of the load switch 29 is connected to the reference potential 11. The cathode of the diode 46 is connected to the first terminal 31 of the ultrasonic exciter circuit and the anode of the diode 46 is connected to the second terminal of the ultrasonic exciter circuit. The diode 46, as a free-running diode, absorbs the self-induction energy of the ultrasonic exciter circuit, avoiding high voltage pulses, when switching-off occurs.

An alternative embodiment of a switch on the output side provides a resistor 28 for limiting and measuring the current flowing in the ultrasonic exciter circuit, between the second terminal of the ultrasonic exciter circuit and the second switch.

The advantages of the invention are based on the point that a pulse output voltage is generated, which is predetermined by the Zener voltage of the Zener diode in any relationship greater than or equal to the input voltage. A further advantage is that the power losses which are involved with linear regulation are kept low or avoided by virtue of switched charging current pulses, involving pulse-wise charging of the storage capacitor with current pulses. The use of a standard logic circuit such as 74HC14 in a single logic gate configuration makes it possible to have a particularly inexpensive and compact structure.

It will be appreciated that the above-described embodiments of the invention have been set forth solely by way of example and illustration of the principles thereof and that various other modifications and alterations may be made therein without thereby departing from the spirit and scope of the invention.

What is claimed is:

1. An ultrasonic position sensor having a high-efficiency pulse generator for generating short voltage pulses, comprising:
   a voltage converter which has a first switch, a second switch, an inductor and a storage capacitor, wherein the first switch is actuatable to enable current pulses in the inductor, which pulses are fed to charge the storage capacitor to generate an output voltage;
   a pulse regulator which generates control pulses that are influenced by a voltage derived from the output voltage, actuating the first switch when said output voltage falls below a lower limit value, until the output voltage has reached an upper limit value greater than or equal to the lower limit value;
   an ultrasonic sensor exciter circuit having an inductive component; and
   an output side switch including a first load switch, said output side switch having a first switching mode during which said first load switch is switched on and voltage at the storage capacitor is fed through said first load switch to the ultrasonic sensor exciter circuit in the form of a discrete voltage pulse, and a second switching mode, during which said first load switch is switched off, isolating the ultrasonic sensor exciter circuit from the voltage at the storage capacitor so that no voltage pulse is fed to the ultrasonic exciter circuit, and self induction energy from the ultrasonic exciter circuit is returned to the storage capacitor.

2. The ultrasonic position sensor according to claim 1, wherein:
   the pulse regulator includes a controllable oscillator comprising a Schmitt trigger inverter, a resonant circuit capacitor and a resistor whose output pulses are influenced by a partial voltage derived from the output voltage by way of a Zener diode connected between said output voltage of said storage capacitor and said oscillator, said Zener diode having a Zener voltage that establishes a working range of the oscillator.

3. An ultrasonic position sensor as set forth in claim 2 wherein the upper limit value is greater than the lower limit value.

4. An ultrasonic sensor having a high efficiency pulse generator as set forth in claim 1, wherein the first switch has a control input switchable by the pulse regulator.

5. An ultrasonic position sensor having a high efficiency pulse generator as set forth in claim 4, wherein the pulse regulator has a Zener diode whose Zener voltage establishes a working range of the pulse regulator.

6. An ultrasonic position sensor having a high efficiency pulse generator as set forth in claim 4, wherein the pulse regulator has a Schmitt trigger inverter, a resonant circuit capacitor and a resistor.

7. An ultrasonic position sensor having a high efficiency pulse generator as set forth in claim 4, wherein the pulse regulator has a Zener diode, a diode, a Schmitt trigger inverter, a resonant circuit capacitor and a resistor, and further comprising:
   means connecting a cathode of the Zener diode to an output voltage of the voltage booster;
   means connecting an anode of the Zener diode to an anode of the diode;
   means connecting a cathode of the diode to an input of the Schmitt trigger inverter;
   means connecting a first terminal of the resonant circuit capacitor to the input of the Schmitt trigger inverter;
   means connecting a second terminal of the resonant circuit capacitor to a reference potential;
   means connecting a first terminal of the resistor to the input of the Schmitt trigger inverter;
   means connecting a second terminal of the resistor to an output of the Schmitt trigger inverter; and
   means connecting the output of the Schmitt trigger inverter to a control input of the first switch of the voltage booster;
   wherein the Schmitt trigger inverter is in operation supplied with a supply voltage of between 1V and 15V.

8. An ultrasonic position sensor having a high efficiency pulse generator as set forth in claim 1, wherein the first switch is a bipolar transistor.

9. A pulse generator as set forth in claim 1, wherein the second switch is connected between the inductor and the storage capacitor, and further comprising:
   means connecting a first terminal of the inductor to an input voltage;
   means connecting a second terminal of the inductor to a first terminal of the first switch and to a first terminal of the second switch;
   means connecting a control terminal of the first switch to an output of the pulse regulator;
   means connecting a second terminal of the second switch to a first terminal of the storage capacitor; and
   means connecting a second terminal of the storage capacitor and a second switching terminal of the first switch to a reference potential.

10. An ultrasonic position sensor having a high efficiency pulse generator as set forth in claim 1, wherein the second switch is connected between the inductor and the storage capacitor.

11. An ultrasonic position sensor having a high efficiency pulse generator as set forth in claim 10, wherein the second switch is a diode.

12. An ultrasonic position sensor having a high efficiency pulse generator as set forth in claim 11, including
   means connecting a first terminal of the first switch to an input voltage;
   means connecting a second terminal of the first switch to a first terminal of the inductor and a cathode of the diode;
   means connecting a control terminal of the first switch to an output of the pulse regulator;
   means connecting a second terminal of the inductor to a reference potential; and
   means connecting an anode of the diode to a first terminal of the storage capacitor.

13. An ultrasonic position sensor having a high efficiency pulse generator as set forth in claim 1, wherein said output side switch with energy recovery, comprises a first load switch, a second load switch, a first diode and a second diode.

14. An ultrasonic position sensor having a high efficiency pulse generator as set forth in claim 13 including
   means connecting a first terminal of the first load switch to an output voltage of the voltage converter;
   means connecting a second terminal of the first load switch to a first terminal of a load element;
   means connecting a first terminal of the second load switch to a second terminal of the load element;
   means connecting a second terminal of the second load switch to a reference potential;
   means connecting a cathode of the first diode to the output voltage of the voltage converter;
   means connecting an anode of the first diode to the second terminal of the load element;
   means connecting a cathode of the second diode to the first terminal of the load element; and
   means connecting an anode of the second diode to common reference potential;
   wherein to generate a current pulse in the load element both load switches are switched on and off simultaneously.

15. An ultrasonic position sensor having a high efficiency pulse generator as set forth in claim 1, further comprising:
   means connecting the output-side switch between an output voltage and a load element, wherein
   the inductor comprises a load element of the exciter circuit; and
   after charging of the storage capacitor the output voltage is fed to the load element when the first load switch is closed.

16. An ultrasonic position sensor having a high efficiency pulse generator as set forth in claim 1, comprising:
   an inductive load element of the exciter circuit in place of the inductor; and
   means connecting the output-side switch between an output voltage and a load element;
   wherein after charging of the storage capacitor the output voltage is fed to a load element when the first load switch is closed.

17. An ultrasonic position sensor having a high efficiency pulse generator as set forth in claim 1, wherein the output side switch is without energy recovery, and comprises said first load switch and a diode.

18. An ultrasonic position sensor having a high efficiency pulse generator as set forth in claim 17, wherein said output side switch further comprises:
   means connecting a first terminal of a load element to an output voltage of the voltage converter;

means connecting a first switching terminal of said first load switch to a second terminal of the load element;
means connecting a second switching terminal of said first load switch to a reference potential;
means connecting a cathode of the diode to the first terminal of the load element; and
means connecting an anode of the diode to the second terminal of the load element.

19. An ultrasonic position sensor having a high efficiency pulse generator as set forth in claim 18, further comprising: a resistor between the second terminal of the load element and the first load switch.

20. An ultrasonic position sensor having a high efficiency pulse generator as set forth in claim 1, wherein the first load switch is an MOS-transistor.

21. An ultrasonic position sensor having a high efficiency pulse generator as set forth in claim 1, wherein the first load switch is a bipolar transistor.

22. An ultrasonic position sensor having a high efficiency pulse generator as set forth in claim 1, further comprising a second load switch.

23. An ultrasonic position sensor having a high efficiency pulse generator as set forth in claim 22, wherein the second load switch is an MOS-transistor.

24. An ultrasonic position sensor having a high efficiency pulse generator as set forth in claim 22, wherein the second load switch is a bipolar transistor.

25. An ultrasonic position sensor having a high efficiency pulse generator as set forth in claim 1, wherein the first switch is an MOS-transistor.

26. An ultrasonic position sensor having a high-efficiency pulse generator for generating short voltage pulses, comprising:
   a voltage converter which has a first switch, a second switch, an inductor and a storage capacitor, wherein the first switch is actuatable to enable current pulses in the inductor, which pulses are fed to charge the storage capacitor to generate an output voltage;
   a pulse regulator which generates output pulses that are influenced by a voltage derived from the output voltage, actuating the first switch when said output voltage falls below a lower limit value, until the output voltage has reached an upper limit value greater than or equal to the lower limit value;
   an ultrasonic sensor exciter circuit; and
   an output side switch including a first load switch which is switched on to generate a voltage pulse in the ultrasonic exciter circuit, whereby the voltage at the storage capacitor is fed to the ultrasonic sensor exciter circuit; wherein said output side switch with energy recovery, comprises a first load switch, a second load switch, a first diode and a second diode; said ultrasonic position sensor further comprising,
      means connecting a first terminal of the first load switch to an output voltage of the voltage converter;
      means connecting a second terminal of the first load switch to a first terminal of a load element;
      means connecting a first terminal of the second load switch to a second terminal of the load element;
      means connecting a second terminal of the second load switch to a reference potential;
      means connecting a cathode of the first diode to the output voltage of the voltage converter;
      means connecting an anode of the first diode to the second terminal of the load element;
      means connecting a cathode of the second diode to the first terminal of the load element; and
      means connecting an anode of the second diode to common reference potential;
      wherein to generate a current pulse in the load element both load switches are switched on and off simultaneously; and said ultrasonic position sensor further comprising
         a Zener diode;
         means connecting a cathode of the Zener diode to the output voltage of the converter; and
         means connecting an anode of the Zener diode to a gate terminal of the P-channel MOS-transistor and, by way of a resistor, to a drain terminal of the N-channel MOS-transistor.

27. An ultrasonic position sensor having a high-efficiency pulse generator for generating short voltage pulses, comprising:
   a voltage converter which has a first switch, a second switch, an inductor and a storage capacitor, wherein the first switch is actuatable to enable current pulses in the inductor, which pulses are fed to charge the storage capacitor to generate an output voltage;
   a pulse regulator which generates output pulses that are influenced by a voltage derived from the output voltage, actuating the first switch when said output voltage falls below a lower limit value, until the output voltage has reached an upper limit value greater than or equal to the lower limit value;
   an ultrasonic sensor exciter circuit; and
   an output side switch including a first load switch which is switched on to generate a voltage pulse in the ultrasonic exciter circuit, whereby the voltage at the storage capacitor is fed to the ultrasonic sensor exciter circuit; wherein said output side switch with energy recovery, comprises a first load switch, a second load switch, a first diode and a second diode; said ultrasonic position sensor further comprising,
      means connecting a first terminal of the first load switch to an output voltage of the voltage converter;
      means connecting a second terminal of the first load switch to a first terminal of a load element;
      means connecting a first terminal of the second load switch to a second terminal of the load element;
      means connecting a second terminal of the second load switch to a reference potential;
      means connecting a cathode of the first diode to the output voltage of the voltage converter;
      means connecting an anode of the first diode to the second terminal of the load element;
      means connecting a cathode of the second diode to the first terminal of the load element; and
      means connecting an anode of the second diode to common reference potential;
      wherein to generate a current pulse in the load element both load switches are switched on and off simultaneously; and said ultrasonic position sensor further comprising
         a Zener diode;
         means connecting a cathode of the Zener diode to the output voltage of the voltage converter; and
         means connecting an anode of the Zener diode to a base terminal of the PNP-bipolar transistor and, by way of a resistor, to a collector terminal of the NPN-bipolar transistor.

* * * * *